Irvin B. Weise
INVENTOR.

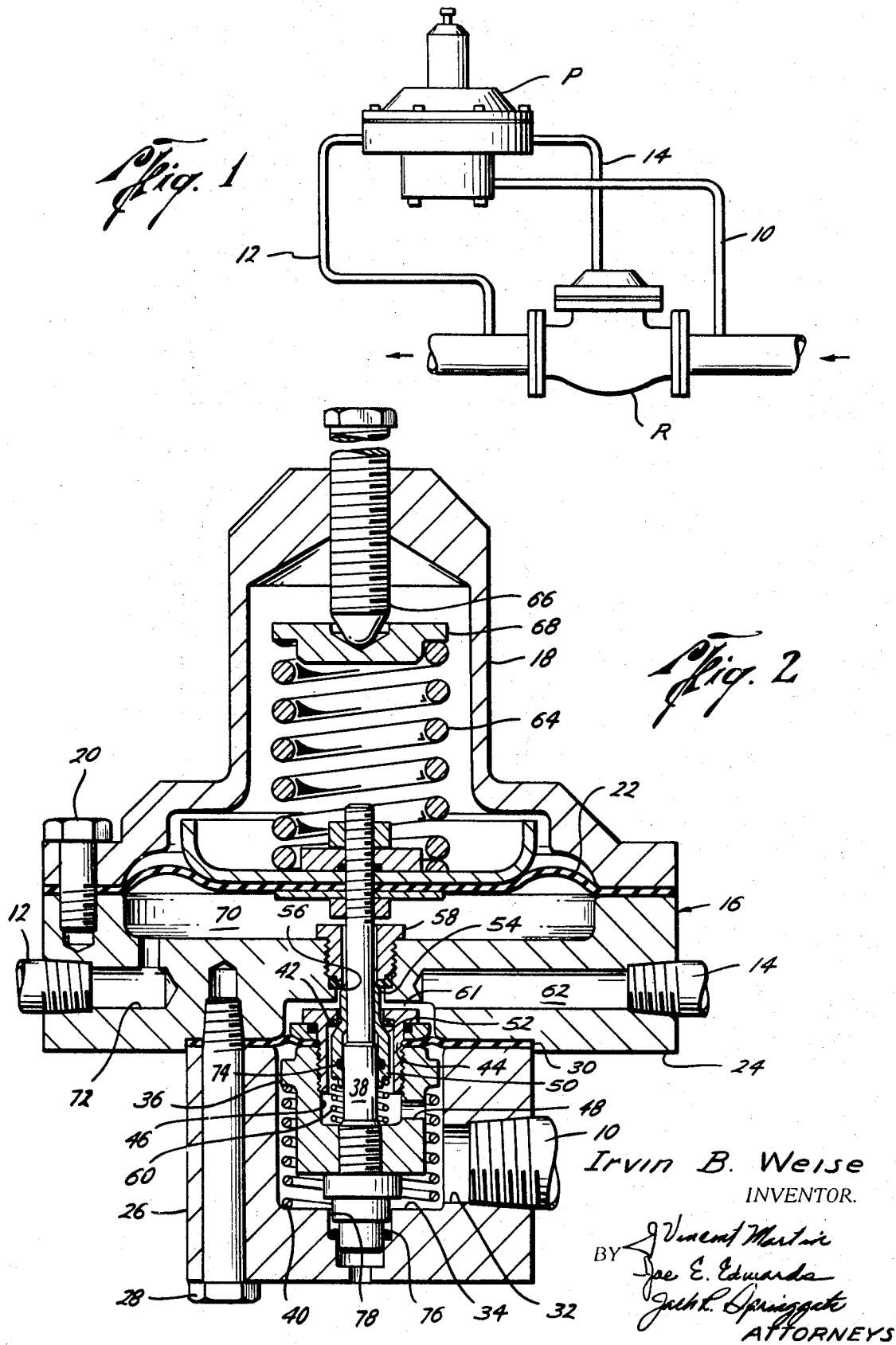

BY
ATTORNEYS

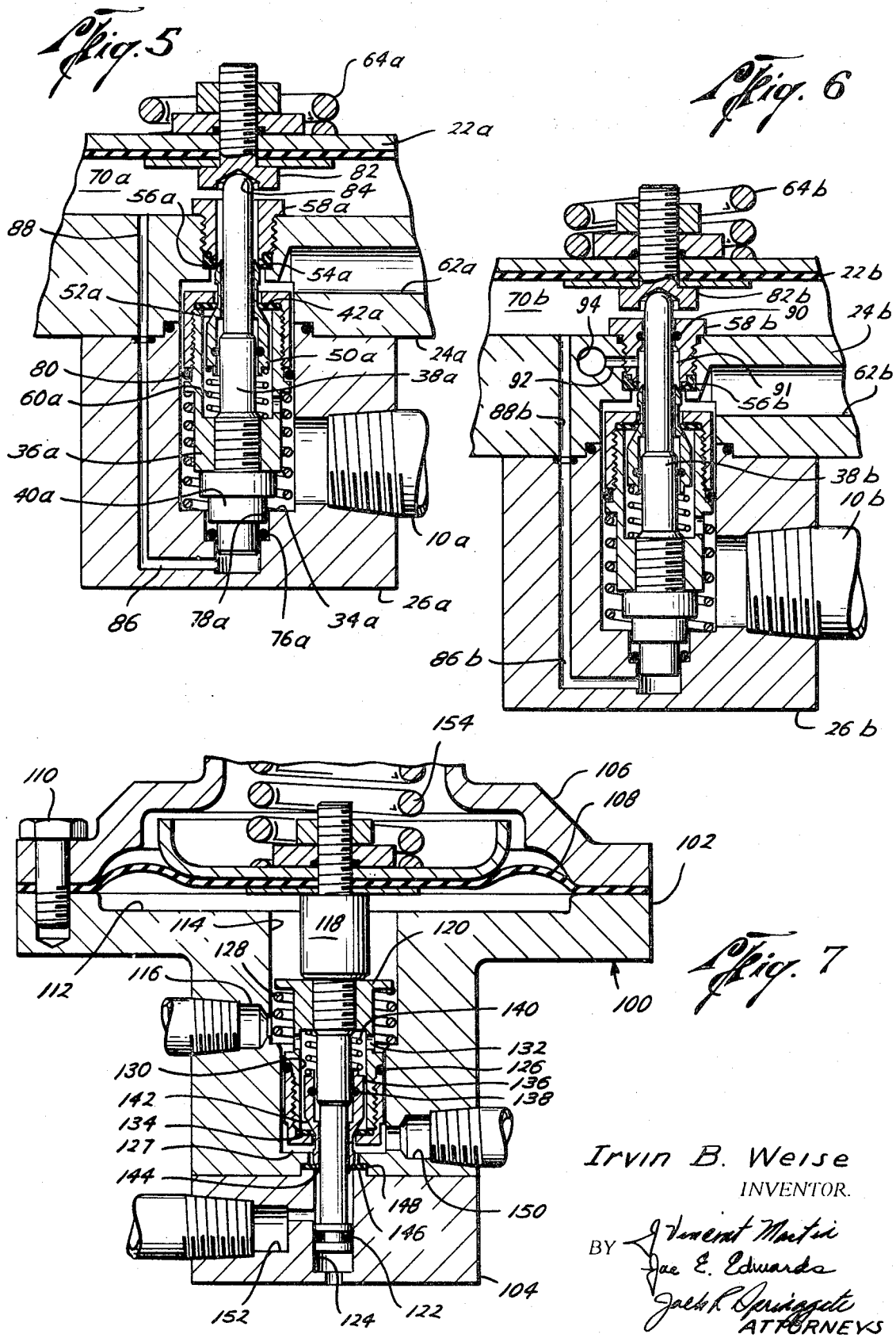

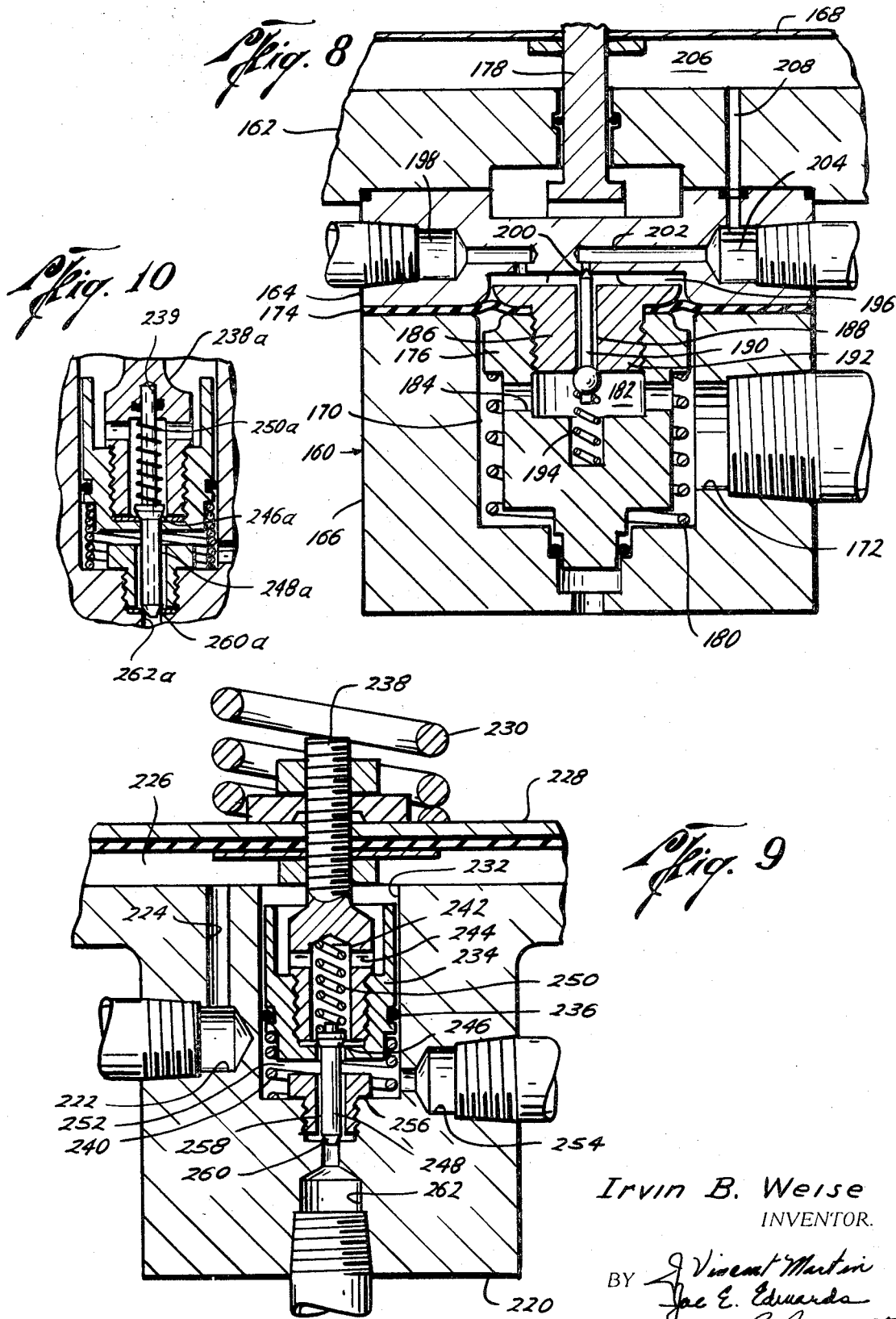

United States Patent Office 3,572,359
Patented Mar. 23, 1971

3,572,359
PRESSURE RESPONSIVE VALVE
Irvin B. Weise, Bellaire, Tex., assignor to Anderson,
Greenwood & Co., Bellaire, Tex.
Filed Aug. 5, 1968, Ser. No. 750,349
Int. Cl. F16k *31/12*
U.S. Cl. 137—85        15 Claims

ABSTRACT OF THE DISCLOSURE

An improved pilot valve having a discharge valve seat, a movable inlet valve seat which is connected to pressure responsive members, and a valve member adapted to engage both seats, wherein movement of the inlet valve seat affects the unseating of the valve member from only one of said valve seats at a time so that fluid flows through the pilot valve only when the controlled pressure between the valve seats is being changed. This abstract is neither intended to define the invention of the application which, of course, is measured by the claims, nor is it intended to be limiting as to the scope of the invention in any way.

BACKGROUND OF THE INVENTION

Pilot valves are preferred to be non-flowing during all conditions except when the control or dome pressure output is being changed in response to varying conditions. The condition during which no fluid flows through the valve is designated herein as an on-control condition. When the pilot valve output is being changed, it is desired that it return to the on-control condition with a minimum flow of fluid therethrough and that over-control and cycling be avoided.

SUMMARY

The present invention relates to an improved pilot valve. The improved pilot valve of the present invention is non-flowing during on-control conditions and by providing a means for comparing inlet and control pressure in a substantially balanced structure avoids over-controlling and cycling and allows a preselected relationship between inlet and control pressure to be established.

An object of the present invention is to provide an improved non-flowing pilot valve for controlling a main valve so that the main valve maintains a constant downstream pressure even when subjected to variations of upstream pressure.

Another object of the present invention is to provide an improved non-flowing pilot valve for controlling a main valve so that the main valve is not subject to over-controlling or cycling.

Another object is to provide an improved non-flowing pilot valve having a preselected sensitivity to the relationship between inlet and output pressures of the pilot valve.

A further object is to provide an improved non-flowing pilot valve having a valve member which is substantially balanced.

Still another object of the present invention is to provide an improved pilot valve structure wherein flow occurs through the pilot valve only when the output or dome pressure is being changed.

A still further object is to provide a non-flowing pilot valve in which the problems of icing due to throttling and dirt infiltration are minimized.

BRIEF DESCRIPTION OF THE DRAWINGS

These and other objects and advantages of the present invention are hereinafter set forth and explained with reference to the drawings wherein:

FIG. 1 is an elevation view illustrating the pilot valve of the present invention connected to control a main pressure reducing regulator.

FIG. 2 is a sectional view of the preferred form of pilot valve of the present invention in non-flowing condition.

FIG. 5 is a partial sectional view of a modified form of the pilot valve of the present invention.

FIG. 6 is a view of a modified valve similar to the valve shown in FIG. 5 and illustrates the discharge port which is added when a separate supply of control gas is used.

FIG. 7 is a partial sectional view of another modified form of pilot valve of the present invention.

FIG. 8 is a partial sectional view of another modified form of pilot valve of the present invention.

FIG. 9 is a partial sectional view of still another modified form of pilot valve of the present invention.

FIG. 10 is a partial view showing a modified balanced valve member.

DESCRIPTION OF THE PREFERRED EMBODIMENTS

Figure 3:
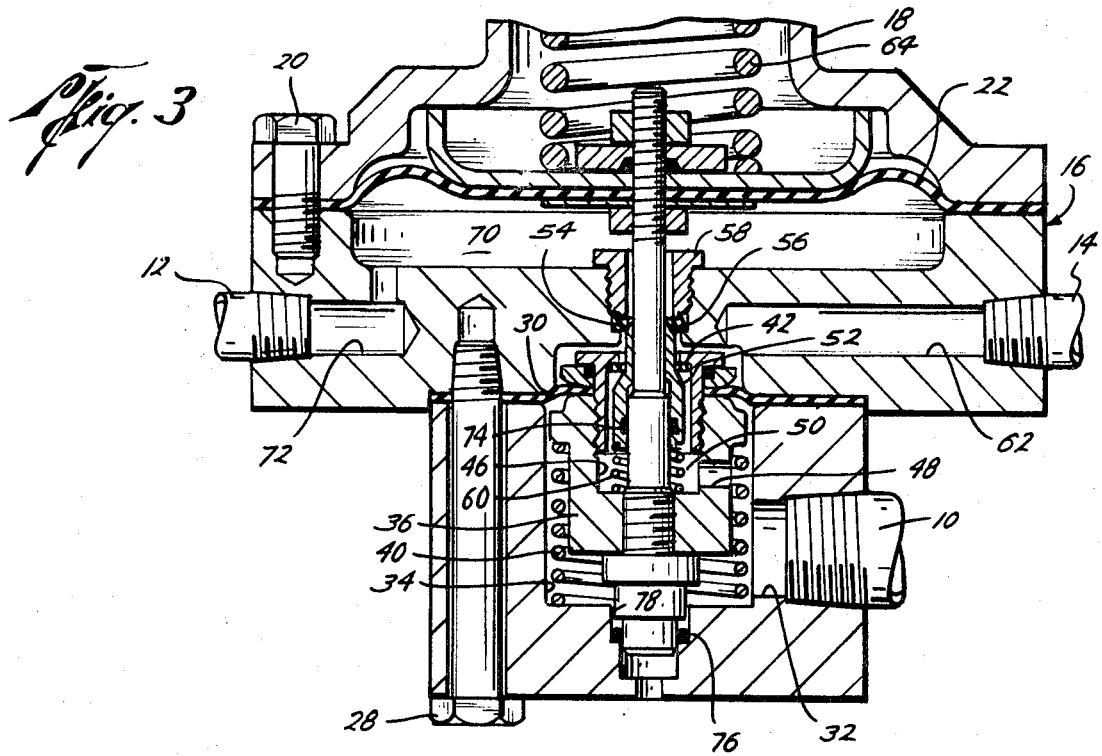
FIG. 3 is a partial sectional view of the pilot valve shown in FIG. 2 to illustrate the open position of the inlet valve.

The pilot valve P of the present invention is shown in FIG. 1 connected to control the main pressure reducing regulator R. Flow through the regulator R is from right to left as indicated by the arrows. Upstream pressure or regulator inlet pressure is delivered to the pilot valve inlet through the duct 10 and the downstream pressure (or regulated pressure) is communicated to the pilot valve signal pressure inlet by the duct 12. The output control pressure or dome pressure is communicated to the dome chamber (not shown) of the regulator R by the duct 14. This output control pressure actuates a valve member in regulator R so that the downstream pressure is maintained constant, even though the upstream pressure is subject to fluctuations.

The pilot valve P senses a change in the pressure downstream of regulator R and varies the output control or dome pressure delivered to the regulator R to move the valve member in regulator R to thereby correct the downstream pressure back to the preselected pressure without causing over-controlling or cycling of the regulator R. Also, it is desired that no flow of fluid occurs through pilot valve P so long as the downstream pressure is maintained at the preselected level.

The preferred form of pilot valve P is shown in detail in FIG. 2. The pilot valve P includes the body 16 and the bonnet 18 which are suitably secured together with screws 20 with main control diaphragm 22 clamped therebetween. As shown, the body 16 includes the upper body member 24 and the lower body member 26 which are suitably secured together with screws 28 with stabilizing diaphragm 30 clamped therebetween.

Fluid under pressure is supplied to the pilot valve P through the duct 10 which is connected through the inlet 32 into chamber 34 defined in the lower body member 26. This pressure is delivered through the inlet 32 into the chamber 34 in which the block 36 is mounted. Block 36 is clamped to the inner periphery of the stabilizing diaphragm 30, is connected to the stem 38 and is urged upwardly within the chamber 34 by the spring 40. The inlet valve seat 42 is defined by the seat insert 44 which is threadedly engaged into the upwardly facing recess 46 defined by the block 36. The port 48 defined by the block 36 provides communication from the interior of the chamber 34 into the recess 46. The valve member 50 is positioned in surrounding relation to the stem 38 and is slidable thereon. The exterior surface of valve member 50 defines the seating surface 52 which is adapted to engage the inlet valve seat 42 and the seating surface 54 which is adapted to engage the discharge valve seat 56 defined by the insert 58 which is, as shown, threaddedly engaged into the upper body member 24. The valve member 50 is urged upwardly on stem 38 by the spring 60.

The space 61 intermediate the two valve seats 42 and 56 is in communication with the duct 14 through the port 62. The pressure supplied through the port 62 and the duct 14 is the control pressure or dome pressure output of the pilot valve P.

The main control diaphragm 22 operates in the space defined between the upper body member 24 and the bonnet 18 and is secured to the upper end of the stem 38 as shown. Diaphragm 22 is biased downwardly by the spring 64. The biasing of the diaphragm 22 is made adjustable from the exterior of the pilot valve P by the screw 66 which extends through the bonnet and engages the upper spring retainer 68. Regulated or signal pressure is communicated to the chamber 70 defined by the diaphragm 22 and the body member 24 from the duct 12 through the port 72. As shown in FIG. 2, the pilot valve P is on-control with valve member 50 in egagement with both valve seats 42 and 56.

Figure 4:
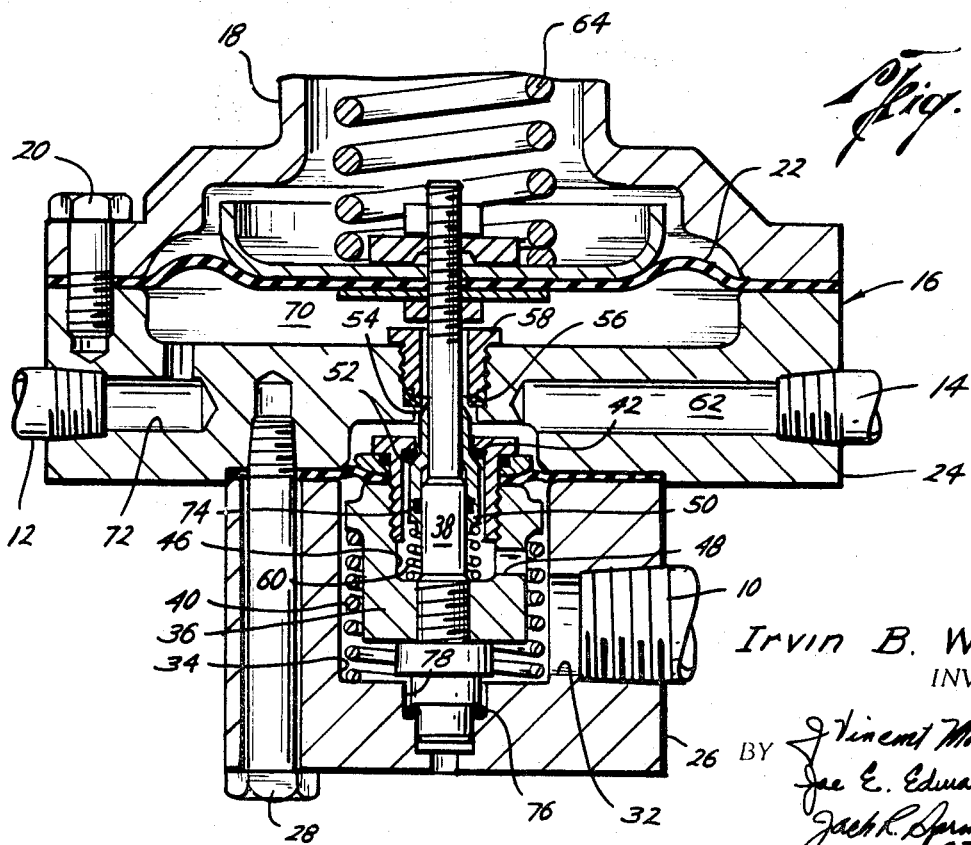
FIG. 4 is a view similar to FIG. 3 but illustrates the open position of the discharge valve.

The operation of the pilot valve P is better understood with reference to FIGS. 3 and 4. As illustrated in FIG. 3, the signal pressure conducted through the duct 12 into the chamber 70 has increased slightly causing the diaphragm 22 to be moved upwardly against the force of the spring 64. By the direct connection of the stem 38 from the diaphragm 22, to the block 36, the block 36 is moved upwardly responsive to such pressure increase. This upward movement of the block 36 moves the inlet seat 42 upwardly away from seating egagement with the seating surface 52 on the valve member 50. The valve member 50 during this action cannot move upwardly because of its seated engagement of its seating surface 54 with the discharge valve seat 56. When the inlet valve is thus opened, fluid pressure is delivered from the inlet chamber 34 through the inlet valve, the port 62 and the duct 14 to the regulator R which the pilot valve is controlling. This increase in pressure causes the main valve member to close slightly whereby the downstream pressure being controlled is reduced. This reduction in pressure is sensed in the chamber 70 allowing the spring 64 to urge the diaphragm 22, the stem 38 and the block 36 downwardly to again close the inlet valve by the engagement of seating surface 52 with the inlet valve seat 42. Thus, the pilot valve P is returned to on-control condition with no fluids flowing therethrough.

The opposite action is provided when the signal pressure is reduced below the preselected level. Such pressure is communicated by the duct 12, port 72 into the chamber 70. A reduction of pressure in chamber 70 allows the force of the spring 64 to move the diaphragm 22, the stem 38 and the block 36 downwardly. Since inlet valve is closed with the seating surface 52 on the valve member 50 in engagement with the inlet valve seat 42, this downward movement causes the valve member 50 to slide downwardly with the movement of the block 36 and the stem 38. Thus, the discharge valve is opened by the movement of the seating surface 54 downwardly out of engagement from the discharge valve seat 56 as illustrated in FIG. 4. In the form of the pilot valve illustrated, control pressure then is conducted from the dome or control chamber of the regulator R, through the duct 14, the port 62 and the discharge valve into the chamber 70. This reduction of pressure on the main valve actuator causes its actuator to open providing an increase in the downstream pressure. The pressure increase is immediately sensed in the chamber 70 causing the diaphragm 22 to overcome the force of the spring 64 to move upwardly. This upward movement moves the stem 38 and the block 36 upwardly and by virtue of the force exerted on the valve member 50 by the spring 60, the valve member 50 moves upwardly therewith to close the discharge valve by bringing seating surface 54 of the valve member 50 into seating engagement with the discharge seat 56. The pilot valve P is thus returned to on-control condition.

Also, as hereinafter explained, an increase in the upstream pressure of regulator R is delivered to chamber 34. When the pressure in chamber 34 is sufficiently more than the output pressure, block 36 moves upwardly opening the inlet valve to increase the output control pressure. This increased output control pressure balances against the inlet pressure and returns block 36 to the position closing the inlet valve. Also, the increase in output control pressure causes the valve member in regulator R to close slightly to compensate for the increased upstream pressure. Similarly, a reduction in the upstream pressure causes the discharge valve to open thereby reducing the output control pressure and allowing the valve member of regulator R to open slightly to compensate for the reduced upstream pressure.

Additionally, the stabilizing diaphragm 30 and block 36 form a stabilizing pressure responsive member which adjusts the output control pressure responsive to changes in the signal pressure and inlet pressure as explained and further returns the pilot valve P to an on-control condition as soon as the output pressure has changed responsive to the changes in inlet pressure or signal pressure and before the signal pressure has returned to normal. For example, assuming the effective area ratio of diaphragm 22 to diaphragm 30 is 20 to 1, then a change of one p.s.i. in signal pressure produces a change of twenty p.s.i. in output control pressure to again place the system on-control. Thus, this stabilizing closes the valves as soon as a balanced condition exists and thereby prevents cycling of the pilot valve.

From the foregoing it can be seen that by adjusting the screw 66 to regulate the compression of the spring 64, the desired downstream pressure in a regulator R may be accurately controlled by the pilot valve P.

It should be noted with reference to FIG. 2 that a suitable seal is provided between the interior of the valve member 50 and the exterior of the stem 38, which is shown as the O-ring 74. Additionally, the lower end of the stem 38 is provided with a suitable seal such as, the O-ring 76 within the recess 78 defined at the lower end of the chamber 34. While O-ring seals are shown in both of these applications, it is preferred that such seals be made to have as little friction as possible. It is contemplated that such seals may be replaced by a low friction seal such as, a ring of polytetrafluoroethylene positioned in a groove and loaded by a spring.

In order to achieve a substantial balancing of the valve member, and to maintain a relationship between inlet and outlet pressures, it is preferred that certain area relationships be maintained in the structure. With reference to the pilot valve illustrated in FIG. 2, it is preferred that the area of the stem 38 at the point of sealing by the O-ring 74 be substantially the same as the area of the discharge valve seat; the area of the inlet valve seat be only slightly larger than the area of the discharge valve seat to minimize the small force acting on the valve member due to the differential between the pressure in the inlet chamber 34 and the pressure between the two valve seats; and the area of the seal at the lower end of the stem 38 provided by the O-ring 76 be preselected to have a relationship to the effective areas of the stabilizing diaphragm 30 and the area of the discharge seat. For example, if it is desired that the regulator R be controlled by the pilot valve P to require a dome pressure output equal to 95 percent of its inlet pressure before the inlet valve begins opening, then the respective areas are designed so that 100 percent of the effective area of the stabilizing diaphragm 30 less the area of the seal at the lower end of the stem 38 is equal to 95 percent of the area of the stabilizing diaphragm 30 less the area of the discharge valve seat. The purpose of such relationship is to provide a valve combination which would begin opening of the valve member of regulator R at the preselected adjusted pressure regardless of wide variations of the inlet pressure. It is also contemplated that in other applications, it may be desirable to balance these areas in other effective ratios. While valve member 50 is substantially balanced by virtue of the relatively small differences in areas of the seating surfaces, a two piece valve member (not shown) may be used therefor to provide a completely balanced valve member.

In FIG. 5, only a portion of the modified pilot valve is illustrated, it being understood that the remaining unshown portions would be the same as shown in FIG. 2. Additionally, in FIG. 5, the parts common to the modified form shown and the pilot valve illustrated in FIG. 2 are given the same numbers with the letter "a" following. Thus, the inlet 10a connects into the body member 26a to provide communication of supply pressure into the chamber 34a. The stem 38a is secured to the diaphragm 22a which is biased by the spring 64a and made responsive to pressures within the chamber 70a. However, it is noted that the block 36a is rendered responsive to pressure by the seal, such as, O-rings 80 or any suitable low friction seals, which seals between the exterior of the block 36a, and the interior of the chamber 34a. The connection between the stem 38a and the diaphragm 22a is provided by a free-pivoting force-loaded connection. This connection includes the rounded upper end of the stem 38a and the head 82 defining the recess 84 in which the upper end of the stem 38a is free to pivot. The head 82 is secured to the underside of the diaphragm 22a, as shown. The spring 40a urges the block 36a and the stem 38a upwardly to maintain the upper end of the stem 38a in engagement with the recess 84 in the head 82. This type of connection minimizes possible eccentric loadings caused by an unsquare spring or other structural eccentricities.

Additionally, the body member 26a defines a passageway 86 communicating from the recess 87 beneath the lower end of the stem 38 to the passageway 88 defined in body member 24a which leads into the chamber 70a. This communication provided by the passageways 86 and 88 balances the pressure exerted on opposite ends of the stem 38.

The operation of this modified form of the pilot valve structure illustrated in FIG. 5 is substantially as previously described. The block 36a, by being sealed against the walls of the chamber 34a acts as a pressure responsive member in the same manner as block 36 and diaphragm 30. The effective areas may be preselected to balance this pilot valve structure in the manner previously described. Also, it is preferred to have as low a friction seal as possible between the exterior of the block 36a and the interior of the chamber 34a to minimize the effect of friction which effect is more pronounced by virtue of the balancing of the areas of the pilot valve of the present invention.

As previously mentioned, the pilot valve may be desired to provide a separate source of supply of actuating fluid under pressure to operate a main valve. The modified form of pilot valve illustrated in FIG. 6 illustrates a pilot valve suitable for using a separate source of supply of fluid under pressure. In FIG. 6, only the portion of the valve is illustrated and all parts common to the other forms of pilot valve are given the same numbers with the suffix letter "b." As can be seen, the pilot valve illustrated in FIG. 6 is substantially the same as the pilot valve illustrated in FIG. 5. In addition thereto, the discharge seat insert 58b is provided with an O-ring seal 90 to seal around the portion of the stem 38b passing therethrough. The chamber 91 defined between the discharge valve seat 56b and the seal 90 is vented through the passageway 92 and the port 94. Thus, as dome or control pressure is discharged through the outlet valve, it is conducted to suitable venting through the passageway 92 and the port 94 rather than being conducted into the signal pressure chamber 70b. Such structure prevents the mixing with the supply fluid in the chamber 70b. Further, supply fluid may be of any preselected pressure. This is advantageous when the pressure of the fluid flowing through the regulator R which is controlled by the pilot valve is out of the preferred range of pressure to be supplied to the pilot valve.

The pilot valve illustrated in FIG. 7 is a modified form of pilot valve structure which is adapted to function as a back pressure regulator, that is, which may be used for controlling an upstream pressure rather than a downstream pressure as illustrated and described with reference to FIGS. 1 and 2.

As shown in FIG. 7, the body 100 is made in two body members 102 and 104. The bonnet 106 is secured to the upper body member 102 with the diaphragm 108 clamped therebetween. The screws 110 or any other suitable means are used to secure the bonnet 106 to the body member 102. The signal pressure chamber or diaphragm chamber 112 is defined between the diaphragm 108 and the upper portion of the upper body member 102. The body member 102 defines the inlet chamber 114. The port 116 provides communication of the fluid pressure to be controlled into the inlet chamber 114 and also to the signal pressure chamber 112. The stem 118 is suitably secured to the diaphragm 108 and extends downwardly therefrom into engagement with the block 120 and is sealed at its lower end by the O-rings 122 in the recess 124 defined in the lower body member 104.

The block 120 is adapted to be reciprocated within the body 100 and is provided with the seals, such as, O-ring 126, to provide a seal between the exterior of the block 120 and the interior of the chamber 127. Spring 128 urges the block 120 upwardly. The block 120 is provided with an internal chamber 130 and the port 132 communicates between the chamber 130 and the inlet chamber 114. The inlet valve seat 134 is defined in the block 120 at the lower end of the chamber 130.

The valve member 136 surrounds and is sealed with respect to the stem 118. The valve member 136 is adapted to slide longitudinally on the stem 118 and is biased downwardly thereon by the spring 140. The valve member 136 defines the seating surface 142 which is adapted to engage the inlet valve seat 134 and the seating surface 144 which is adapted to engage the discharge valve seat 146. The discharge valve seat 146 is formed by the insert 148 which is clamped between body members 102 and 104. Body members 102 and 104 are suitably secured together by means not shown.

The intermediate chamber 127 between inlet valve seat 134 and discharge valve seat 146 is connected through the port 150 to the main valve being controlled by the pilot valve to control the dome pressure in the main valve. Fluid flow passing through the discharge valve is discharged through the port 152. It should be noted that stem seal provided by the O-ring 122 in all positions of the stem 118 remains below the communication between the discharge port 152 and the discharge valve.

As in other forms of the pilot valve of the present invention, the block 120 functions as a pressure responsive or stabilizing member by virtue of the seals provided by the O-ring 126. It should be noted that this structure may be modified to include a stabilizing diaphragm in place of such seals in the manner illustrated in FIG. 2.

In operation, the signal pressure or pressure being controlled is conducted through the inlet 116 and into the chambers 112 and 114. As in other forms of the pilot valve, the diaphragm 108 is biased by the spring 154. The force exerted by the spring 154 is preferably adjustable as shown and described with reference to the structure illustrated in FIG. 2. When the pressure being controlled increases beyond the preselected control pressure, this increase pressure is communicated into the diaphragm chamber 112 and urges the diaphgram 108 upwardly against the force of the spring 154. This movement of the diaphragm 108 moves the stem 118 and the block 120 upwardly. Since valve member 136 is in engagement with the inlet seat 134, the valve member 136 is lifted with this movement of the block 120 causing the discharge valve to be opened by disengagement of the seating surface 144 on the valve member 136 from the discharge valve seat 146. In this condition, flow of the dome pressure fluid is conducted from the dome through the port 150, the intermediate chamber 127 and it is discharged from the structure through the discharge outlet port 152. The decrease in dome pressure causes the main valve to open, thereby reducing the upstream pressure. When the pressure being controlled is reduced to the preselected amount, the force exerted by the spring 154 causes the diaphragm 108, the stem 118, the block 120 and the valve member 136 to move downwardly to close the discharge valve.

Whenever the pressure being controlled is less than the preselected pressure, such pressure change is communicated to the diaphragm chamber 112 and the force exerted by the spring 154 causes the diaphragm 108, the stem 118 and the block 120 to move downwardly. Since the valve member 136 is in engagement with the discharge seat 146, it cannot move downwardly. The relative downward movement of the block 120 with respect to the valve member 136, disengages the inlet seat 134 from the seating surface 142 on the valve member 136 thereby opening the inlet valve to conduct fluid pressure into the intermediate chamber 127. This fluid pressure is delivered through the port 150 to the dome of the main valve causing the main valve to close whereby the back pressure of the main valve which is being controlled is increased. Such increase is communicated to chamber 112 to cause an upward movement responsive thereto to move the inlet valve seat 134 into engagement with the seating surface 142 on the valve member 136.

As previously described, the balancing of the pressure areas with the pilot valve illustrated in FIG. 7 is substantially similar to that previously described with reference to the other forms of pilot valve.

The modified form of pilot valve illustrated in FIG. 8 is a variation of the pilot valve illustrated in FIG. 2 wherein the valve member rather than surrounding the stem, is provided in a solid shape but adapted to function in the same manner. In this form of the invention, the same balancing features are provided.

In the form of pilot valve illustrated in FIG. 8, the body 160 includes three portions, upper body member 162, intermediate body member 164, and lower body member 166. A bonnet (not shown) clamps the main diaphragm 168 to the body 160 and an adjustable spring biasing the diaphragm downwardly is provided as described in relation to FIG. 2. The lower body member 166 defines the inlet chamber 170 into which fluid pressure is conducted through the port 172. The stabilizing diaphragm 174 is positioned between body member 166 and body member 164 and is secured at its inner periphery to the block 176. Block 176 is connected to stem 178 and the spring 180 is provided to urge the block 176 upwardly in the chamber 170. The block 176 defines the chamber 182 which is in communication with the inlet chamber 170 through the ports 184. The upper end of chamber 182 is closed by the insert 186. Insert 186 defines a central passageway 188 through which the valve member 190 extends. The insert 186 also defines the inlet valve seat 192. The valve member 190 is urged upwardly with respect to the block 176 by the spring 194. The upper end of the passageway 188 opens into the intermediate chamber 196. Dome pressure or outlet control pressure port 198 defined in body 164 is in direct communication with the intermediate chamber 196 as shown. Additionally, discharge valve seat 200 is defined in body 164 and adapted to be engaged by the upper end of the valve member 190. The passageway 202 communicates with the signal pressure port 204. Also port 204 is in communication with the diaphragm chamber 206 through the passageway 208 extending upwardly through the body members 164 and 162.

In operation, the pilot valve shown in FIG. 8 is adapted to control a downstream pressure in the manner described with reference to FIGS. 1 and 2. This downstream pressure is communicated to the diaphragm chamber 206 through the signal pressure port 204. Assuming that such pressure increases above the preselected desired pressure, the pressure overcomes the force of the spring and moves the diaphragm 168 upwardly. Because of the direct connection of the diaphragm 168 to the stem 178 and the block 176, this upward movement disengages the seat 192 from the valve member 190 thereby allowing pressure from within the inlet chamber to be conducted into the intermediate chamber and delivered through the port 198 to increase the dome pressure of the main valve. This increase in pressure causes the main valve to close slightly thereby reducing the downstream pressure. As the downstream pressure is reduced, the diaphragm 168, stem 178 and block 176 move downwardly to again cause engagement between the valve member 190 and the inlet valve seat 192.

In the event that the pressure being controlled decreases below the preselected desired level, the diaphragm 168 moves downwardly responsive to the spring force causing the block 176 to move downwardly. Because of the engagement of the inlet valve seat 192 with the valve member 190, valve member 190 also moves downwardly disengaging valve member 190 from the discharge seat 200. When the discharge valve is open, dome pressure from the main valve is conducted through the port 198, the intermediate chamber 196 and discharged through the passage 202 and the port 204. This decrease of dome pressure in the main valve causes the main valve to open slightly allowing the downstream regulated pressure to be increased. When the regulated pressure builds back up to the predetermined desired level, such pressure increase is transmitted to the diaphragm chamber 206 moving the diaphragm upwardly and bringing the valve member 190 back into engagement with the discharge valve seat 200.

As explained with reference to FIGS. 1 and 2, the relative areas may be preselected to provide the desired response to variations in upstream pressure. The diaphragm 174 is exposed to inlet (or upstream) pressure and to dome pressure and responds thereto to vary the dome pressure responsive to variations in upstream pressure so that compensation is provided for such variations to assist in maintaining a substantially constant downstream pressure.

The modified form of the pilot valve, a portion of which is illustrated in FIG. 9, is designed to perform the function of a back pressure regulator or a relief pilot and in such manner is similar to the pilot valve illustrated in FIG. 7. This pilot valve includes the body 220, having an inlet pressure connection or port 222 which communicates by the passageway 224 into the diaphragm chamber 226 defined between the diaphragm 228 and the upper portion of the body 220. As previously mentioned, with respect to the other views, only a portion of this pilot valve is shown, it being understood that the pilot valve includes a bonnet similar to that shown in FIG. 2, which clamps the diaphragm 228 between the bonnet and the body 220 and includes adjustment of the force exerted by the spring 230 on the diaphragm 228.

The body 220 defines the recess or chamber 232 which is in communication with the diaphragm chamber 226. The block 234 is positioned in the recess 232 and functions as a pressure responsive member by reason of the seal between its exterior and the interior of the recess 232, provided by the O-ring 236. Additionally, the block 234 is secured by the stem 238 for movement with the diaphragm 228. Spring 240 is positioned within the chamber 232 to urge the block upwardly therein. The block 234 defines the internal recess 242 which is in communication with the chamber 232 through the ports 244. The block 234 also defines the inlet valve seat 246 at the lower end of the recess 242. The valve seat 246 is positioned to be engaged by the valve member 248. Valve member 248 is urged downwardly toward engagement with the inlet valve seat 246 by the spring 250. The intermediate chamber 252 is defined within the recess 232 below the block 234 and communicates through the port 254 to provide dome pressure or control pressure to the main valve. The insert 256 which is threadedly secured into the body 220 at the lower end of the recess 232 defines a central pasageway 258 through which the valve member 248 extends. The discharge valve seat 260 is defined in the body 220 surrounding the communication between the discharge port 262 and the pasageway 258. If desired, valve member 248 may be substantially balanced as shown in FIG. 10. Valve member 248a includes the extension 249 which extends into and is sealed for sliding in the recess 239 in stem 238. Valve member 248a is also hollow to provide for equalization of pressure between port 262a and the recess 239.

In operation, as the pressure being controlled increases above the preselected desired pressure, this increase of pressue is conducted through the inlet port 222, the pasageway 224 into the diaphragm chamber 226 and the recess 232. An increase in pressure in the diaphragm chamber 226 causes the diaphragm 228 to move upwardly whereby the block 234 is moved upwardly. Because of the engagement of the valve member 248 with the inlet valve seat 246 defined by the block 234, the valve member 248 is lifted thereby disengaging it from the discharge valve seat 260. This opening of the discharge valve conducts dome or output pressure from the intermediate chamber and the main control valve and discharges it through the discharge port 262. This discharge of pressure reduces the dome pressure in the main valve causing the valve to open. Opening of the valve reduces the back pressure and as this reduction in back pressure is sensed in the diaphragm chamber 226, the diaphragm moves downwardly, allowing the block 234 and valve member 248 to move downwardly to seat valve 248 on the discharge valve seat 260.

Whenever the pressure being controlled falls below the preselected desired pressure, the reduced pressure is communicated to the diaphragm chamber 226. The reduction in pressure in the diaphragm chamber 226 allows the force of the spring to move the diaphragm 228 downwardly. Downward movement of the diaphragm 228 moves the stem 238 and the block 234 downwardly. Since the valve member 248 is in engagement with the discharge seat 260, the downward movement of the block 234 disengages the inlet valve seat 246 from the valve member 248 allowing pressure from the recess 232 to be conducted into the intermediate chamber and through the port 254 to the dome of the main control valve. An increase in pressure in the dome of the main control valve causes the valve to close slightly thereby allowing the back pressure being held by the valve to increase. An increase in this back pressure is transmitted to the diaphragm chamber 226 returning the diaphragm upwardly. The upward movement of the diaphragm is accompanied by an upward movement of the block 234 bringing the inlet valve seat 246 back into engagement with the valve member 248.

From the foregoing it may be seen that the present invention provides an improved non-flowing pilot valve which is substantially balanced and responsive to both upstream and downstream pressures of the main valve which it controls so that the main valve is not subject to cycling or over-controlling. The improved pilot valve of the present invention is maintained in an on-control condition or no-flow condition for a maximum amount of time which minimizes problems of icing due to throttling and dirt infiltration. As explained, the improved pilot valve may have preselected area relationships to preselect the pressure ratio at which the pilot valve responds or to preselect the sensitivity to the relationship between inlet and output pressures of the pilot valve (upstream and dome pressures in the case of a regulator valve as hereinbefore disclosed).

The foregoing disclosure and description of the invention are illustrative and explanatory thereof, and various changes in the size, shape and materials as well as in the details of the illustrated construction, may be made within the scope of the appended claims without departing from the spirit of the invention.

What is claimed is:

1. A pressure responsive valve, comprising
 a body having a diaphragm chamber,
 a diaphragm mounted in said diaphragm chamber,
 means communicating with said diaphragm chamber to conduct a signal pressure to such diaphragm,
 a stabilizing pressure responsive member mounted for movement in said body,
 means connecting said stabilizing pressure responsive member to said diaphragm,
 means supplying a source of control pressure fluid to one side of said stabilizing member,
 said body and said stabilizing member defining an intermediate chamber on the opposite side of said stabilizing member,
 a control port in said body communicating with said intermediate chamber,
 a first passage communicating between said supply means and said intermediate chamber,
 a first valve seat surrounding said first passage,
 a second passage communicating between said intermediate chamber and said diaphragm chamber,
 a second valve seat surrounding said second passage,
 a valve member movably mounted in said body and having surfaces for engagement with said first and second valve seats respectively, and
 means resiliently urging said valve member into engagement with said valve seats.

2. A pressure responsive valve according to claim 1, wherein said supply means includes,
 a port in said body in communication with said first passage.

3. A pressure responsive valve according to claim 1, wherein said stabilizing member includes,
 a block movably mounted in said body, and
 pressure responsive means mounted between said block and said body,
 said block defining one of said first and second passages and its valve seat whereby movement of said block in one direction unseats said valve member from one of said valve seats and movement of said block in the opposite direction unseats said valve member from the other of said valve seats.

4. A pressure responsive valve according to claim 1, wherein
 said valve member is annular in shape and surrounds said connecting means and including,
 means sealing between said valve member and said connecting means.

5. A pressure responsive valve according to claim 4, wherein
 the area of sealing of said sealing means is substantially the same area as the area of said second valve seat.

6. A pressure responsive valve according to claim 5, including
 a second sealing means for sealing between said connecting means and said body,
 the sealing area of said second sealing means being preselected with respect to the effective pressure area of said stabilizing pressure responsive member to provide the desired sensitivity of opening of the inlet valve with respect to the pressures in said inlet chamber and said intermediate chamber.

7. A pressure responsive valve according to claim 1, wherein said stabilizing pressure responsive member includes
 a block movably mounted within said body, and
 an annular diaphragm secured to said body around its outer periphery and secured to said block around its inner periphery.

8. A pressure responsive valve according to claim 1, wherein said stabilizing pressure responsive member includes
 a block movably mounted within said body, and
 means sealing between the exterior of said block and the interior of said body and separating one of said first and second passages from said intermediate chamber.

9. A pressure responsive valve according to claim 1, wherein
 the connection between said connnecting means and said diaphragm is a free pivoting force loaded connection.

10. A pressure responsive valve according to claim 9, including
 means conducting fluid pressure from said diaphragm chamber to the opposite end of said connecting means from said free pivoting force loaded connection.

11. A pressure responsive valve according to claim 1, wherein
 said valve member extends through one of said valve seats.

12. A pressure responsive valve, comprising
 a body,
 an inlet chamber defined within said body and having an inlet communicating therewith,
 an intermediate chamber defined within said body and having a control port communicating therewith,
 a signal pressure chamber defined by said body and having a signal port communicating therewith,
 a first pressure responsive member mounted in said body between said inlet chamber and said intermediate chamber;
 a second pressure responsive member mounted in said signal pressure chamber,
 a first valve seat surrounding a passageway communicating between said inlet chamber and said intermediate chamber and movable with said first pressure responsive member,
 a second valve seat surrounding a passageway communicating between said intermediate chamber and said signal pressure chamber,
 means biasing said second pressure responsive member in opposition to the fluid pressure in said signal pressure chamber,
 means connecting said first valve seat and said second pressure responsive member,
 a valve member movably positioned within said body and having surfaces for engagement with said first and second valve seats, respectively, and
 means resiliently urging said valve member toward engagement with said valve seats whereby said valve member is seated on at least one of said valve seats at all times.

13. A pressure responsive valve, comprising
 a body having a diaphragm chamber,
 a diaphragm mounted in said diaphragm chamber,
 a stabilizing pressure responsive member mounted for movement in said body,
 means connecting said stabilizing pressure responsive member to said diaphragm,
 means communicating with said diaphragm chamber and one side of said stabilizing member to conduct a signal pressure to said diaphragm chamber and to supply pressure fluid to one side of said stabilizing member,
 said body and said stabilizing member defining an intermediate chamber on the opposite side of said stabilizing member,
 a control port in said body communicating with said intermediate chamber,
 a first passage communicating between said supply means and said intermediate chamber,
 a first valve seat surrounding said first passage,
 a second passage communicating between said intermediate chamber and said diaphragm chamber,
 a second valve seat surrounding said second passage,
 a valve member movably mounted in said body and having surfaces for engagement with said first and second valve seats respectively, and
 means resiliently urging said valve member into engagement with said valve seats.

14. A pressure responsive valve according to claim 13, wherein said first pressure responsive member includes,
 a block movably positioned within said body, and
 means sealing between said block and said body.

15. A pressure responsive valve according to claim 14, wherein
 said block defines said first valve seat and said body defines said second valve seat.

References Cited

UNITED STATES PATENTS

| 2,736,337 | 2/1956 | Parks et al. | 137—492.5 |
| 2,958,337 | 11/1960 | Holbrook | 137—85X |
| 2,984,216 | 5/1961 | Greenlees, Jr. | 137—85X |
| 3,018,136 | 1/1962 | Williams | 137—627.5X |
| 3,461,908 | 8/1969 | Newcomb et al. | 137—492.5 |

ROBERT G. NILSON, Primary Examiner

U.S. Cl. X.R.

137—487, 492.5, 627.5